United States Patent [19]

Sherwood et al.

[11] 3,800,004

[45] Mar. 26, 1974

[54] PHENOLIC BASED UNSATURATED POLYESTER RESIN

[75] Inventors: Donald W. Sherwood, Buffalo; Carmine A. Siconolfi, Tonawanda, both of N.Y.

[73] Assignee: Hooker Chemical Corporation, Niagara Falls, N.Y.

[22] Filed: July 14, 1971

[21] Appl. No.: 162,675

[52] U.S. Cl. ................... 260/848, 161/198, 260/14, 260/17.2, 260/38, 260/52, 260/59, 260/844
[51] Int. Cl. ........................ C08g 37/20, C08g 5/18
[58] Field of Search .......... 260/844, 848, 837 R, 52, 260/59, 77

[56] References Cited
UNITED STATES PATENTS

| | | | |
|---|---|---|---|
| 3,420,914 | 1/1969 | May | 260/837 |
| 3,248,276 | 4/1966 | Bean et al. | 161/195 |
| 3,331,730 | 7/1967 | Bean et al. | 260/844 |
| 3,408,422 | 10/1968 | May | 260/837 |
| 2,826,562 | 3/1958 | Shokal | 260/77 |
| 3,055,869 | 9/1962 | Wilson et al. | 260/77 |
| 2,035,528 | 3/1936 | Brubaker | 260/77 |

*Primary Examiner*—John C. Bleutge
*Attorney, Agent, or Firm*—Peter F. Casella; James F. Mudd; Monroe D. Edelman

[57] ABSTRACT

Curable thermoplastic polymer compositions having low acid numbers are prepared by a novel one step procedure by reacting an alpha, beta-ethylenically unsaturated dicarboxylic acid, anhydride, or acid halide with a mixture of oxyalkylated derivatives of a polyfunctional novolak resin mixture and a substantial proportion, at least 5 percent by weight of oxyalkylated derivative of a monofunctional phenol. The thermoplastic polymer compositions are co-polymerizable with ethylenically unsaturated monomers, e.g., styrene, to form thermoset polymers which are characterized by excellent resistance to caustic alkalis.

17 Claims, No Drawings

PHENOLIC BASED UNSATURATED POLYESTER RESIN

FIELD OF INVENTION

The use of monofunctional materials in polymers generally has not received acceptance in the art since such materials terminate the polymer chains. For example, in U.S. Pat. No. 3,248,276, it was proposed to utilize monobasic acids, anhydrides or acid chlorides as modifiers of resinous reaction products of hydroxy alkyl phenyl ethers of novolaks or resoles with alphabeta unsaturated dicarboxylic acids, acid chlorides or anhydrides. In this procedure the modifier replaced a portion of the dicarboxylic reactant and consequently the resulting reaction product was characterized by having terminal carboxyl groups as evidenced by the high acid number of the polymer composition which deleteriously affected the resistance of the resulting polymer and crosslinked products derived therefrom to alkali. However, it has been discovered that there is a variety of monofunctional materials which when combined with certain other materials result in an improved polymer. In accordance with one important aspect of the present invention, suitable polyfunctional materials may be used with monofunctional material and a second polyfunctional material to produce desirable plastic products that are characterized by, among other things, low cost, flame resistance, low density, good electrical properties, high strength, convenient handling characteristics, freedom from undue discoloration, and especially resistance to alkaline chemical reagents.

BACKGROUND OF INVENTION

Phenolic condensation products which are fusible and soluble, such as novolaks or resoles, are useful in the process of the present invention as the polyfunctional material which may be reacted with the mono- and second polyfunctional material. As a typical example, a novolak resin which is a condensation product of a phenol and formaldehyde may be reacted with a mixture of mono- and polyfunctional materials of such a nature that the hydroxyl groups of the novolak and the carboxyl groups of the dicarboxylic acid monoester are blocked from further reaction by esterification and/or etherification and then the resinous resultant product may be polymerized through remaining functional groups of the esterifying and/or etherifying materials. By the esterification or etherification of the free reactive phenolic hydroxyl groups of the novolak, the remaining ortho or para positions of the phenolic residues are rendered inactive to normal condensation polymerization with substances such as aldehydes or ketones.

Phenolic resins have been used in laminating and molding operations of the prior art where high temperatures and pressures are necessary in order to obtain suitable products because in condensation polymerization, water or ammonia is eliminated. The resultant products had only fair flame resistance, and phenolic resins also are generally dark colored and darken to even deeper hues on exposure to light, exhibit poor alkali resistance, and have other series disadvantages. The art has long sought polymers which combine the desirable properties of the phenolic resins with low cost and other desirable properties such as light colors, an ability to be cured to high-strength products by addition polymerization without elimination of water, ammonia or other by-product, at low or contact pressure, and which may be produced at low cost. However, prior to the present invention, entirely satisfactory polymers having the above characteristics were not available.

OBJECTS OF INVENTION

It is an object of the present invention to provide a novel process for the preparation of improved polymers based on fusible, solvent soluble condensates of a phenol and an aldehyde, and to provide the polymers thus prepared.

It is a further object of the present invention to provide a novel process for preparing improved curable thermoplastic polymers from phenol-aldehyde condensates, a process for preparing thermoset polymers therefrom, and to provide the thermoset polymers thus prepared.

A further object of the present invention to prepare improved polyester resins from phenol-aldehyde condensates, and to provide the polymers thus prepared.

A further object of the present invention to provide a novel polymerizable composition of matter comprising an ethylenically unsaturated polymer of the invention and an ethylenically unsaturated monomer copolymerizable therewith.

A further object of the present invention to provide improved castings, laminates and reinforced plastic articles.

Other objects and advantages of the present invention will be apparent to those skilled in the art upon reference to the following detailed description and the examples.

REFERENCE TO RELATED APPLICATION

In copending application of D. W. Sherwood, R. B. Tideswell and F. M. Kujawa, Ser. No. 162,676 filed of even date herewith, polymer compositions are disclosed which comprise a mixed polyester of an alpha beta unsaturated dicarboxylic acid having on one side the residue of an oxyalkylated novolak resin and the other side the residue of a monofunctional alcohol boiling at above about 135° centigrade, said mixed polyester having an acid number of below about 30 and being copolymerizable with an ethylenically unsaturated monomer to provide thermoset polymers which are highly resistant to attack by chemical reagents especially caustic alkalis. It is further disclosed therein to prepare the mixed polyesters by a step wise procedure in which the oxyalkylated novolak is first esterified with the alpha beta unsaturated dicarboxylic acid component to form the monoester and thereafter to react the monoester with the monofunctional alcohol component to form the mixed polyester having an acid number of less than about 30. Alternately the mixed diester can be prepared by first preparing a monoester of the polyfunctional alcohol component and the alpha beta unsaturated dicarboxylic acid component and subsequently reacting this monoester with the oxyalkylated novolak component to form the mixed polyester having an acid number of less than about 30.

SUMMARY OF INVENTION

In accordance with the present invention, the production of the polymer compositions comprising mixed polyesters of the type described above has been improved by carrying out the aforesaid multi-step procedure in essentially one step thereby resulting in a highly effective economical process. Thus, it has now been discovered that the preparation of fusible solvent soluble condensation products of a phenol and an aldehyde having reactive phenolic hydroxyl groups, said condensation products comprising an amount of uncondensed phenolic component sufficient to prevent the formation of high molecular products and gelling of the condensation mixture can be reacted through the phenolic hydroxyl groups with a compound with is capable of hydroxyalkylating the free phenolic hydroxyl groups. The resultant hydroxy alkylated mixture, in turn, can be reacted with a compound which is ethylenically unsaturated to thereby provide curable thermoplastic polymer compositions having relatively low acid numbers. These compositions, then, can be cured to product improved thermoset polymers having the desirable properties mentioned herein.

DESCRIPTION OF INVENTION

Soluble, fusible phenol-aldehyde condensates suitable for use in part as starting materials in practicing the present invention are well known to the art and may be prepared by well known methods. The phenol-aldehyde condensate should be soluble in organic solvents such as acetone and it should not be advanced to the insoluble C stage or resite stage. When the phenol is phenol itself and the aldehyde is formaldehyde, one type of condensate which is highly satisfactory contains a mixture of condensation units which may be exemplified by the following formula:

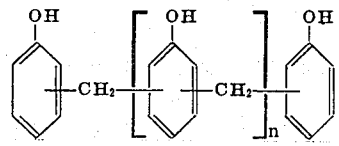

where $n$ represents a numeral varying from 0 to 10, and often higher provided the resin is fusible and acetone or organic solvent-soluble. Generally, n will have an average value of within the range of 0.1 to 0.75. Preferably, the phenol-aldehyde condesate is a novolak, which contains more than one mole of phenol per mole of aldehyde.

Examples of phenols which may be used in preparing phenol-aldehyde condensates for use in practicing the invention include phenol itself or substituted phenols having the following general formula:

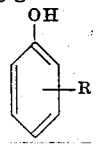

where R may be H, F, Cl, Br or a suitable substituent selected from the following:
a. Alkyl groups of 1 to 18 carbon atoms in any of their isomeric forms and substituted on the phenolic nucleus in the ortho, meta or para positions;
b. Alicyclic groups of 5 to 18 carbon atoms such as cyclohexyl, cyclopentyl, methyl cyclohexyl, butyl-cyclohexyl, etc;
c. aryl or aralkyl groups of 6 to 18 carbon atoms such as phenyl, alpha-methyl benzyl, benzyl, cumyl, etc.;
d. Alkyl, alicyclic, aryl and aralkyl ketones wherein the hydrocarbon is defined hereinbefore.
e. Alkyl, alicyclic, aryl and aralkyl carboxylic groups wherein the hydrocarbon is defined hereinbefore.

Suitable substituted phenols include the following:
Para-tertiary-butylphenol,
Para-secondary-butylphenol,
Para-tertiary hexylphenol,
Para-isooctyl-phenol,
Para-phenylphenol,
Para-benzylphenol,
Para-cyclohexylphenol,
Para-decyl-phenol,
Para-dodecyl-phenol,
Para-tetra-decyl-phenol,
Para-octa-decyl-phenol,
Para-nonyl-phenol,
Para-methyl-phenol,
Para-beta-naphthyl-phenol,
Para-alpha-naphthyl-phenol,
Para-pentadecyl-phenol,
Para-cetyl-phenol,
Para-cumyl phenol,
Para-hydroxy acetophenone,
Para-hydroxy benzophenone,
a phenol alkylated with limonene, a phenol alkylated with oleic acid, as well as the corresponding ortho and meta derivatives such as meta-butyl phenol and ortho-butyl phenol, as well as mixtures thereof.

From the foregoing, it is apparent that substantially any phenol may be used in practicing the present invention provides it has a reactive phenolic hydroxyl group and is capable of reacting with aldehydes such as formaldehyde to produce a condensate. The pure refined phenols may be used, but this is not always necessary. For instance, phenols may be alkylated and then reacted with an aldehyde as the crude product which may contain some polyalkylated as well as unalkylated phenols. Mixtures of phenols mentioned herein also may be used.

Mixtures of phenols which comprise, in addition to a phenol of the character defined above, a phenol substituted in both the ortho and para positions of the phenyl nucleus and hence are not capable of reacting with the aldehyde can also be used, providing that no more than about 40 percent by weight of the mixture of the said ortho and para substituted phenol is present in the mixture. For example the mixture may contain up to about 40 percent by weight of 2,4,6-trichlorophenol, 2,4,6-tribromophenol, 2,6-dichloro-p-cresol and the like. The presence of such phenols in the mixture imparts a fire retardant character to the resultant polyester compositions of the present invention.

In producing the parent phenol-aldehyde condensates, any suitable aldehyde or mixtures of aldehydes capable of reacting with a phenol and having not more than, for example, eight carbon atoms is satisfactory provided it does not contain a functional group or structure which is detrimental to the resinification reaction or with esterification or oxyalkylation of the resin. The preferred aldehyde is formaldehyde, which may be in aqueous solution or in any of its low polymeric forms such as paraform or trioxyane. Other examples of aldehydes include acetaldehyde, propionaldehyde, butyraldehyde, benzaldehyde, furfural, 2- ethylhexanal, ethyl-butyraldehyde, heptaldehyde, glyoxal, etc.

The amount of aldehyde to be condensed with the phenol may be varied to prepare novolaks of varying molecular weights and the viscosity of the finished resin may be controlled by the mol weight of the novolak.

In instances where a novolak is prepared, it is preferred that the aldehyde and phenol be reacted using an acid catalyst such as sulfuric, hydrochloric or oxalic acid, but basic catalysts also can be used. In some instances, catalysts may not be necessary. Examples of alkaline catalysts include ammonia, amines and quaternary ammonium bases. Wetting agents of the anionic type such as sodium alkyl aryl sulfonate, may speed up the reaction when weak acids are used and also may be present.

The preparation condensation products of a phenol and an aldehyde, it is known, leads to mixtures which contain dimeric, trimeric and higher condensation products. The relative proportion of these polymeric condensation products can be controlled to some degree by the ratio of the phenol to aldehyde utilized as well as the type of condensation catalyst and temperature of the reaction. Thus, the higher the ratio of the phenol to aldehyde, the greater the proportion of dimer and the lesser the proportion of trimeric and higher products. As the ratio of the phenol to aldehyde approaches unity, the preparation of higher molecular weight products increases to such a degree that the condensation mass becomes less soluble in organic solvents, and in the extreme attains the insoluble "C" stage or resite stage.

It is thus preferred to effect this condensation using a ratio of the phenol to aldehyde of greater than 2 to 1, and especially from about 2.5 to 8 to 1.

The condensation product thus formed contains at least about 20 percent by weight of dimer and may, when using higher ratios of the phenol to aldehyde, be present in the condensation product mass in the amount of 50 percent or more by weight of the mixture of condensation products. The polyfunctional, i.e., higher than dimer to difunctional condensation products, are highly branched rather than linear in structure. Such products are relatively poorly soluble in organic solvents, and are more prone to gellation than the less complex dimers. On being reacted with the dicarboxylic reactant, the polyfunctional products form high molecular weight highly branched, gellable polyesters. However, in the presence of monofunctional phenolic compounds, which function as chain stoppers, the formation of these undesirable high molecular, highly branched polyesters can be substantially prevented or effectively limited.

Accordingly, sufficient phenolic compound should be present in the condensation mass so that on reaction with the aldehyde component the resultant condensation mixture contains a relatively high proportion, usually from about 20 to 50 percent by weight of the dimeric condensation product and a relatively low proportion of trimeric and higher condensation products together with at least about 5 percent by weight of unreacted phenolic compound.

Preferably the condensation mass contains from about 25 to about 40 percent by weight of unreacted phenol, about 20 per cent to about 45 percent of dimeric condensation product and about 25 percent to about 40 percent of higher polyfunctional condensation products. Upon reaction of the condensation mass with the oxyalkylating agent, the phenolic mixtures are etherified to form a mixture of mono-, di-, tri-, and higher functional oxyalkyl ethers which are present in substantially the same relatively proportions. This mixture when reacted with the dicarboxylic acid forms polyesters, but due to the presence of the monofunctional oxyalkyl phenolic ether, esters derived from the polyfunctional condensation products are limited in complexity and molecular weight by the chain stopping mechanism of the monofunctional alcohol.

In accordance with the present invention, improved polymers can be prepared which preferably contain substantially no free reactive phenolic groups (less than about 0.5 percent of the phenolic hydroxyl, for example). The phenol-aldehyde resin mixture containing free, uncondensed phenolic component can be reacted with a suitable substance designed to etherify or esterify the phenolic hydroxyl groups provided that at least one of the phenolic hydroxyl groups present in each phenol-aldehyde condensate unit is reacted with said substance or substances, and the resultant products are in turn reacted with an ethylenically unsaturated compound.

It is preferred to first hydroxyalkylate the phenolic hydroxyl groups, and then to esterify the resultant hydroxyalkyl-groups with a dicarboxylic acid, acid chloride or acid anhydride. The preferred method of hydroxyalkylation is by reaction with compounds containing a mono-oxirane ring. Such compounds include ethylene, propylene, butylene, styrene and cyclohexene oxides, glycide and epichlorohydrin. Many other mono-epoxides can be used, but the alkylene oxides containing not more than six carbons are generally used. Additional useful compounds are phenyl glycidyl ether and related compounds prepared from the reaction of epichloro-hydrin and monofunctional alkylated and halogenated phenols such as pentachlorophenyl glycidyl ether.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl-, dimethyl-, diethyl-, trimethyl-, triethyl-, tripropyl-, dimethyl-benzyl-, dimethylhydroxy-ethyl-, dimethyl-2-hydroxypropyl amine and the like, and salts of strong bases and weak acids such as sodium acetate or benzoate. The reaction may be carried out at temperatures of fifty to two hundred fifty degrees centigrade, and preferably in the absence of solvents, although solvents may be used for the higher molecular weight resins to reduce viscosity.

The phenolic hydroxyl of the novolak mixture containing uncondensed phenolic compound(s) may also be hydroxyalkylated by reacting alkylene halohydrins with the phenolic hydroxyl using equivalent amounts of an alkali metal hydroxide to bring about the reaction. Suitable alkylene halohydrins are ethylene chloro or bromohydrins, propylene chloro or bromohydrins, 2,3-butylene chloro or bromo-hydrins, glyceryl chloro-, or bromo-hydrins.

Another method for hydroxyalkylating phenolic hydroxyl groups is by reaction with alkylene carbonates such as ethylene carbonate and propylene carbonate, using a catalyst such as potassium carbonate.

It is preferred that the novolak containing mixture be reacted until substantially all of the reactive phenolic hydroxyl groups have reacted (leaving preferably less than 0.5 percent of the phenolic hydroxyls unreacted). This is desirable to prevent inhibition of the reaction of the unsaturated esters with ethylenically unsaturated monomers and to give oxidation and light stability in the resultant product. At least one mol of alkylene oxide or other etherifying or esterifying agent is required per mole of phenolic hydroxyl. However, resins prepared by reaction with up to three mols of alkylene oxide per mol of phenolic hydroxyl are useful. It is required that there be at least about one hydroxyalkyl group per phenolic hydroxyl group in the novolak mixture. As will be obvious to those skilled in this art, the relative composition of the mono and poly functional derivatives in the oxyalkylated product will be substantially the same as in the original phenol-aldehyde condensation mixture.

The properties, especially the flexibility, of the mixed unsaturated polyesters of this invention can be advantageously modified by incorporated into the esterification reaction a relatively small quantity of an alkylene glycol having from 2 to 16 carbon atoms per molecule. By the term alkylene glycol we include the well known polyalkylene ester glycols. Suitable alkylene glycols are ethylene, diethylene, triethylene, tetramethyl glycols, butylene glycols, propylene, dipropylene and tripropylene glycols, pentylene glycols, neopentyl glycols, 2-methyl-2-ethylpropane diol-1,3, 2,2-diethyl propane diol-1,3, and bis(1,4-hydroxymethy) cyclohexane. Polyols, such as glycerol, trimethylol propane and pentaerithritol can be used for this purpose also. In a variant of the process of this invention, the alkylene glycol or polyol may be added to the hydroxyalkylated novolak component prior to the reaction thereof with the dicarboxylic acid component. The amount of such component used can vary up to a ratio of about five moles of polyol per mole of hydroxyalkylated novolak and especially the ratio used is from 0.3 to 4 moles of polyol per mole of hydroxyalkylated novolak.

A variety of acids, acid halides, acid anhydrides, etc., or mixtures thereof may be used for reaction with the hydroxyalkyl phenylethers of novolak mixture as prepared in accordance with the invention. For example, the hydroxy-alkyl novolaks may be esterified with 0.5 to 1.0 mol of an alpha, beta-unsaturated dicarboxylic acid anhydride per hydroxyl equivalent. The carboxylic acids and the corresponding acid chlorides and acid anhydrides may include maleic, fumaric, chloromaleic, ethylmaleic, itaconic, citraconic, xeronic, and pyrocinchoninic, either alone or as a mixture. The resins may be modified for special properties by using some polycarboxylic anhydrides which are not alpha, beta-unsaturated along with the above-mentioned anhydrides. For example, 1,4,5,6,7,7-hexachlorobicyclo-(2.2.1)-5-heptene-2,3-dicarboxylic anhydride and tetrachlorophthalic anhydride impart flame resistance. Examples of other useful acids, acid chloride and anhydrides include phthalic, tetrahydrophthalic, cyclopentadiene and methyl cyclopentadiene-maleic adducts, succinic, tricarballylic, glutonic, dodecyl succinic, etc.

The esterification of the hydroxyether mixture is preferably carried out at a temperature in the range of about one hundred fifty to two hundred fifty degrees centigrade, although high and lower temperatures can be used. The esterification is carried out under atmospheric or subatmospheric conditions. When polycarboxylic acids are used, the progress of the esterification reaction can be monitored by measuring the quantity of water of esterification that is produced or by following the reduction of the acid number of the mass. Small quantities of toluene or xylene can be used as azeotroping agents to facilitate removal of the water. When acid chlorides are used, it is preferred to use solvents during the reaction. The acid chloride can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed, such as by stripping, at the completion of the reaction. The progress of the reactions involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are tertiary amines such as pyridines, and triethylamine.

The resultant polymer composition is thermoplastic and probably contains as the principal constituent the mixed polyester of the alpha beta ethylenically unsaturated dicarboxylic acid having on one side the residue of the hydroxyalkylated novolak resin and on the other side the residue of the mono functional oxyalkylated phenolic compound.

This composition is quite complex and probably contains in addition to diesters, a considerable proportion of modified polyester type materials due to the significant content of trifunctional and higher functional novolak type condensation products, which together with the difunctional oxyalkylated novolaks, enter into the polyesterification reaction. The monofunctional oxyalkylated phenolic alcohols serve primarily as chain terminating components. The higher functional derivatives form highly complex branched chain polyesters which are prevented from cross linking to the point of gellation by the chain terminating effect of the monofunctional oxyalkylated phenol.

This mixed polyester composition being practically completely esterified has a low acid number, that is less than about 30 and contains ethylenic unsaturation derived from the dicarboxylic acid component.

This ethylenic polymer composition may be cured by cross-linking in the presence of a catalytic amount of a conventional polymerization catalyst for addition polymerization of ethylenically unsaturated materials, including free radical catalysts, such as benzoyl peroxide and other organic peroxides. The polymer may also be cured by copolymerization with an ethylenically unsaturated monomeric material copolymerizable therewith, and preferably in the presence of a catalytic amount of a polymerization catalyst such as mentioned above.

The ethylenically unsaturated monomers which may be used in curing or cross-linking the ethylenically unsaturated polymers of the present invention may be varied widely. While other materials may be used, it is preferred that addition polymerization be practiced since no by-product ammonia, water, etc., is formed and the problems resulting therefrom are not experienced. The monomers useful in curing the thermoplastic unsaturated polymers include vinylic compounds or mixtures thereof capable of cross-linking ethylenically unsaturated polymer chains at their points of unsaturation and usually they contain the reactive group

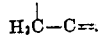

Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol-bis-(allyl carbonate), triallyl phosphate and other allyl esters, and vinyl toluene, diallyl chlorendate, diallyl tetrachlorophthalate, the lower aliphatic esters other than methyl of methacrylic and acrylic acids, ethylene glycol diacrylate, dimethacrylate, diethacrylate, etc. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

To prepare laminating resins, monomers which will copolymerize with the diesters of the dibasic unsaturated acids or ether linkages may be used. These include styrene, vinyltoluene, diallylphthalate, triallyl phosphate and other alkyl esters, methylstyrenes, vinyl acetate, acrylate and methacrylate esters, divinyl benzene, chloro-styrenes, etc.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparing the reinforced articles and laminates include textile fibers or cloth, glass fibers or cloth, roving, etc. Castings may be prepared from the improved polymers of the present invention and such products likewise have been found to exhibit the improved properties of the polymers discussed above to a surprising degree. In general, well known processes of the prior art may be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as Orlon, mineral fibers such as asbestos, natural fibers such as aluminum and steel.

Following are examples of fillers that can be used in the polymers of the invention: inorganic materials such as calcium carbonate, clay and pigments, and organic materials such as wood flour, cotton and rayon flock, sisal fibers, pigments and dyes.

The foregoing detailed description and the following specific examples are for purposes of illustration only and are not intended as being limiting to the spirit or scope of the appended claims. Parts and percentages are by weight and temperatures are given in degrees centigrade unless otherwise specified.

EXAMPLE 1

A mixture of 1,400 parts (14.9 moles) of phenol and 4.2 parts of oxalic acid was heated to 110° and to it was added 350 parts of 37.2 percent formalin (4.38 mols). The mixture was heated under reflux at about 103° for one hour, and then distilled to a vapor temperature of 165° at atmospheric pressure to remove water and a small amount of phenol. The distilland weighed 1412 parts and contained about 60 percent novolak resin (dimer and higher functional material) and 40 percent unreacted phenol. After the addition of 0.7 part of sodium acetate and 7 parts of dimethylaminopropylamine, the reactor was closed and 830 parts (14.3 mols) of 1,2 propylene oxide were charged slowly over several hours. The mass was heated at 160° to 180° until the pressure dropped to zero, p.s.i.g. following which it was vacuum stripped at 150 degrees for one hour to yield 2212 parts of a mixture of oxypropylated novolak and phenoxypropanol.

A mixture of 1134 parts of the above prepared oxypropylated resin mixture and 398 parts (3.43 mols) of fumaric acid was heated to 815° while passing a slow steady stream of nitrogen over the mass. After 4 ½ hours, the temperature was increased to 200°. After 6 ½ hours the acid number was 25.1 and after 8 ¼ hours the acid number was 18.1. The mixture, 1,380 parts, was cooled to about 130° and to it was added 690 parts of styrene. The resultant amber colored solution has a viscosity of 200 cps at 25°. The solution was stabilized by the addition of 0.2 part of toluene hydroquinone.

The solution had a S.P.I. gel time of 6 minutes and 18 seconds. The copolymerized resin had a heat distortion temperature of 61°.

A one-eighth inch laminate was prepared from 3 plies of 2 ounce glass mat using the above prepared composition as a binder therefor. The laminate was cured at ambient temperature for about 16 hours using 2 percent of a mixture of 1/2 percent cobalt naphthenate and 1 percent methylethyl ketone peroxide as a catalyst. The laminates were post cured at 110° for one hour.

The properties of the laminate were

| | |
|---|---|
| Flexural strength, p.s.i. | 22,527 |
| Regular impact, imp/in.* | 7.16 |
| Tensile strength, p.s.i. | 16,134 |
| Modulus flexure | 9.11 × 10$^5$ |
| Compressive strength, p.s.i. | 24,852 |
| % Elongation at break | 1.72 |
| Barcol hardness | 48 |
| % Glass in laminate | 33.7 |

*ASTMD-256

The accelerated corrosion resistance of a one-eighth inch plate casting prepared from this composition prepared by adding 2 percent of a paste containing 50 percent of benzoyl peroxide in tricresyl phosphate and curing 16 hours at 50° and 24 hours at 120°, immersing weighed portions of the casting in the below indicated aqueous reagents for 96 hours at the boil and then determining the weight loss. The corrosion data obtained are set out in Table I below.

TABLE I

| Reagent | % Weight Loss |
| --- | --- |
| ½% NaOH | 0.71 |
| 10% NaOH | 0.29 |
| 10% $H_2SO_4$ | 0.42 |
| $H_2O$ | 0.79 |

These data are indicative of the excellent resistance to attack by chemical reagents of the thermoset polymers of our invention.

EXAMPLE II

To a hot (100°) mixture of 2,400 parts (25.5 mols) of phenol and 7.2 parts of oxalic acid, 300 parts (2.9 mols) of paraformaldehyde were slowly added. The mixture was heated under reflux, about 113°, for one hour, and distilled, to remove water and some phenol to a temperature of 165°. To 2457 parts of the residue, 12.3 parts of dimethylaminopropylamine and 1.2 parts of anhydrous sodium acetate were added and the mixture heated to 146°. After addition of 1,582 parts (27.3 mols) of 1,2-propylene oxide, the mixture was heated under autogeneous pressure until the pressure fell to zero p.s.i.g. The mass was heated under vacuum at 150° for one hour to yield 4,039 parts of a mixutre of oxypropylated novolak and phenoxypropanol-2.

A mixture of 703 parts (6.05 mols) of fumaric acid and 1,995 parts of the above prepared mixture was heated to 185° while passing a slow steady stream of nitrogen over the surface of the mixture. After 6 hours, the temperature was increased to and maintained at 195°. The acid number of the mixture was 40 and after eleven hours, the acid number decreased to 16.5. The mixture then was cooled to about 125° and 0.24 part of toluene hydroquinone was added. The mixture was dissolved in 1,214 parts of styrene to produce an amber liquid having a viscosity of 800 cps. The SPI gel time was 5 minutes and 18 seconds. The heat distortion temperature of the copolymerized resin was 78°.

A one-eighth inch laminate prepared as in Example I had the following physical properties.

| | |
| --- | --- |
| Flexural strength, p.s.i. | 22,717 |
| Regular impact, imp./in. | 7.19 |
| Tensile strength, p.s.i. | 15,228 |
| Modulus fluxure | $9.48 \times 10^5$ |
| Compressive strength, p.s.i. | 26,578 |
| % Elongation at break | 1.60 |
| Barcol hardness | 50 |
| % Glass in laminate | 33.3 |

The results of the accelerated corrosion resistance measured with a one-eighth in. plate casting prepared as in Example 1 are set out in Table II below.

TABLE II

| Reagent | % Weight Loss |
| --- | --- |
| ½% NaOH | 0.46 |
| 10% NaOH | 0.16 |
| 10% $H_2SO_4$ | 0.43 |
| $H_2O$ | 0.62 |

These data from the 96 hour boil accelerated corrosion test are indicative of the excellent resistance to chemical reagents of the co-polymers of our invention.

EXAMPLE III

A mixture of 98.7 parts (1.05 mols) of phenol and 0.291 part of oxalic acid was heated to about 100° and 11.5 parts (0.364 mol) of paraformaldehyde (about 95 percent strength) were slowly added. The mixture was heated under reflux for 1 hour and then distilled to a temperature of 185 to 190° to strip off water and some phenol. The residue was cooled to about 150°, and after addition of 0.5 part of dimethylaminopropylamine and about 0.05 part of anhydrous sodium acetate, 67 parts of (1.17 mols) of 1,2-propylene oxide were added over a period of about 2 hours at 150° to 165° under autogenous pressure. The mass was maintained at between 150° and 165° for one-half hour and then vacuum stripped for one-half hour at 150°. Thereafter 52.5 parts (0.535 mol) of maleic anhydride were added and the mixture heated to and maintained at 185° for 8 hours while passing a slow steady stream of nitrogen through the mass. The temperature of the mixture was raised to 195° and maintained thereat until the acid number of the mixture decreased to 17.2 which required about 11 hours additional heating at 195°. The mass was cooled to about 150° and 0.037 part of toluene-hydroquinone was added. The resulting mass was dissolved in 120 parts of styrene to give a dark amber solution having a viscosity of 550 cps at 25°. The solution had a SPI gel time of 5 minutes and 24 seconds. The copolymerized resin had a heat distortion temperature of 64°.

A one-eighth inch laminate prepared as described in Example 1 above had the following physical properties.

| | |
| --- | --- |
| Flexural strength, p.s.i. | 24,281 |
| Tensile strength, p.s.i. | 14,956 |
| Regular Impact, imp/in. | 6.42 |
| Modulus flexure | $9.86 \times 10^5$ |
| Compressive strength, p.s.i. | 29,366 |
| % Elongation at break | 1.72 |
| Barcol hardness | 50 |
| % Glass in laminate | 34.32 |

The results of the accelerated ("96 hour boil") corrosion test performed as described in Example I, above, are set out in Table III below.

TABLE III

| Reagent | % Weight Loss |
| --- | --- |
| ½% NaOH | 0.89 |
| 10% NaOH | 0.69 |
| 10% $H_2SO_4$ | 0.69 |
| $H_2O$ | 1.03 |

EXAMPLE IV

The procedure of Example 3 was repeated with the exception that a molar equivalent amount of fumaric acid (62.0 parts, 0.535 mol) was used instead of maleic anhydride (52.5 parts, 0.535 mol) to prepare the alpha beta unsaturated mixed polyester composition. The esterification was considered complete after 20 hours of heating at 185° to 195° when the acid number of the mixture was 20.3.

The solution of the esterified mixture and styrene was dark amber in color and had a viscosity, at 25°, of 650 cps. The SPI gel time of this composition was 7 minutes and 15 seconds. The resulting polymer has a heat distortion temperature of 76.5°.

The properties of the ⅛ inch glass mat laminate were

| | |
|---|---|
| Flexural strength, p.s.i. | 22,021 |
| Tensile strength, p.s.i. | 16,826 |
| Regular Impact imp/in. | 6.85 |
| Modulus flexure | 9.29 × 10⁵ |
| Compressive strength, p.s.i. | 28,691 |
| % Elongation at break | 1.64 |
| Barcol hardness | 48–50 |
| % Glass in laminate | 37.2 |

The results of the accelerated corrosion resistance test of a one-eighth plate casting ("96 hour boil") are set out in Table IV below:

TABLE IV

| Reagent | % Weight Loss |
|---|---|
| ½% NaOH | 0.80 |
| 10% NaOH | 0.71 |
| 10% H₂SO₄ | 0.71 |
| H₂O | 0.80 |

EXAMPLE V

A mixture of 1,598 parts (17 mols) of phenol and 4.8 parts of oxalic acid was heated to 100 degrees and to it were added 144 parts (4.55 mols) of paraformaldehyde (95 percent pure). The mixture was heated under reflux at about 122° for 1 hour and then distilled to a temperature of 203° to remove water and some phenol.

The residue, 1,220 parts, was analyzed by Gel Permeation Chromatography ("GPC") and found to contain approximately

| | |
|---|---|
| Phenol | 28 percent |
| Dimer | 36.6 percent |
| Trimer | 19.2 percent |
| Tetramer and higher functional material | 16.3 percent |

A mixture of 1,200 parts of the above prepared composition, 6 parts of dimethylaminopropylamine and 0.6 part of anhydrous sodium acetate was heated at 160 to 170 degrees as 827 parts (14.25 mols) of 1,2 propylene oxide was introduced into the mixture. Thereafter the mass was vacuum stripped at about 150° for one-half hour.

A mixture of 1,377 parts of the above prepared oxypropylated composition and 505 parts (4.35 mols) of fumaric acid was heated to 180° to 185° while passing a slow stream of nitrogen through the mass. Four hours thereafter, the temperature was increased to about 195° and maintained thereat until the acid number had decreased to 18.0 (about 13 ¾ hours). After the addition of 0.52 part of toluenehydroquinone, and cooling to about 150°, 1,524 parts of the base resin were dissolved in 990 parts of styrene. The solution was amber in color, had a SPI gel time of 5 minutes and 48 seconds and the copolymerized resin had a heat distortion temperature of 95°.

The physical properties of a one-eighth inch glass mat laminate were as follows:

| | |
|---|---|
| Flexural strength, p.s.i. | 26,092 |
| Tensile strength, p.s.i. | 16,162 |
| Regular impact, imp/in. | 7.58 |
| Modulus flexure | 1.04 × 10⁵ |
| Compressive strength, p.s.i. | 29,702 |
| % Elongation at break | 1.68 |
| Barcol hardness | 50 |

The results of the acculated corrosion resistance list ("96 hour boil") with one-eighth inch plate casting are set out in Table V.

TABLE V

| Reagent | % Weight Loss |
|---|---|
| ½ NaOH | 0.73 |
| 10% NaOH | 0.78 |
| 10% H₂SO₄ | 0.73 |
| H₂O | 0.74 |

Our invention has been described in the above specification and illustrated by the several descriptive examples which include the best known manner of carrying out the process of our invention. It will be understood however the various modifications in the embodiments disclosed herein can be made as will be obvious to those skilled in this art, without departing from the spirit of the invention.

What is claimed is:

1. The process which comprises reacting an alpha,-beta-unsaturated dicarboxylic acid, anhydride or acid halide with a mixture of (1) a polyfunctional oxyalkylated phenol aldehyde novolak resin containing at least about 20 percent by weight of difunctional oxyalkylated phenol aldehyde condensation product, and (2) at least about 5 percent by weight of said mixture of an oxyalkylated monofunctional phenol, said mixture containing less than 0.5 percent by weight of free phenolic hydroxyl gorups, said reaction being continued until the acid number of the reaction product is less than about 30, and thereafter admixing said reaction product with styrene.

2. The process of claim 1 in which the alpha beta unsaturated dicarboxylic acid is fumaric acid.

3. The process of claim 1 in which the alpha beta unsaturated anhydride is maleic anhydride.

4. The process of claim 1 in which the said mixture comprises from about 25 to about 40 percent by weight of said oxyalkylated monofunctional phenol from about 20 to about 45 percent of said difunctional oxyalkylated condensation product and from about 25 to about 45 percent of oxyalkylated trimeric and higher functional condensation products.

5. The process of claim 4 in which the condensation products are phenol-formaldehyde condensation products.

6. The process of claim 4 in which the oxyalkylated monofunctional phenol contains an oxyalkylated an ortho-para substituted phenol selected from the group consisting of 2,4,6-tribromophenol, 2,4,6-trichlorophenol and 2,6-dichloro-p-cresol.

7. The process of claim 1 in which the oxyalkylated components are oxypropylated components.

8. The process of claim 7 in which the alpha beta unsaturated dicarboxylic acid is fumaric acid.

9. The process of claim 8 in which the reaction is continued until the acid number of the reaction product is less than about 20.

10. The process of claim 1 wherein the mixture of said reaction product and styrene is polymerized in the presence of a polymerization catalyst.

11. The process of claim 11 wherein the alpha beta unsaturated dicarboxylic acid is fumaric acid.

12. A thermoset polymer prepared by the process of claim 10.

13. A laminated plastic article comprising the thermoset polymer of claim 12 and a reinforcing medium therefor.

14. A thermoset polymer prepared by the process of claim 11.

15. A laminated plastic article comprising the thermoset polymer of claim 14 and a reinforcing medium therefor.

16. The product obtained by the process of claim 4 wherein said reaction product is soluble in styrene at ambient temperature.

17. The product obtained by the process of claim 1 wherein said reaction product is soluble in styrene at ambient temperature.

* * * * *

UNITED STATES PATENT OFFICE
CERTIFICATE OF CORRECTION

PATENT NO. : 3,800,004
DATED : Mar. 26, 1974
INVENTOR(S) : Donald W. Sherwood; Carmine A. Siconolfi It is certified that error appears in the above-identified patent and that said Letters Patent are hereby corrected as shown below:

Column 1, line 65, "series" should read--serious--.
    Column 3, line 29, "C" should read--"C"--; Column 4, line 34, "provides" should read--provided--.
    Column 5, line 42, "to difunctional" should read--or difunctional--.
    Column 14, Claim 1, line 30, "alpha,-" should read--alpha,--; Claim 1, line 39, "gorups" should read--groups--.

Signed and Sealed this

Second Day of November 1976

[SEAL]

Attest:

RUTH C. MASON
*Attesting Officer*

C. MARSHALL DANN
*Commissioner of Patents and Trademarks*